Patented May 22, 1951

2,553,776

UNITED STATES PATENT OFFICE 2,553,776

MANUFACTURE OF N-TRICHLOROMETHYL-THIOIMIDES

Allen R. Kittleson, Cranford, N. J., assignor to Standard Oil Development Company, a corporation of Delaware No Drawing. Application August 30, 1949, Serial No. 113,255

13 Claims. (Cl. 260—326)

This invention relates to new and useful improvements in the preparation of N-trichloromethylthioimides and more particularly to improved methods for the obtaining of higher yields of N-trichloromethylthioimides.

This application is a continuation-in-part of U. S. application Serial No. 50,888, filed September 23, 1948, A. R. Kittleson and H. L. Yowell, now Patent No. 2,553,771.

There were disclosed in U. S. application Serial No. 90,271, filed April 28, 1949, as new compounds, N - trichloromethylthioimides. These compounds were disclosed to be effective parasiticides and especially effective fungicides.

N-trichloromethylthioimides are compounds in which the >NSCCl₃ group is linked to two acyl groups. The phrase "acyl group" refers to groups of the following character

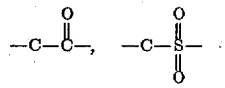

etc. (see Hackh, "Chemical Dictionary," second edition, page 21). The compounds are thus properly regarded as N-trichloromethylthioimides (or N-thiotrichloromethylimides) (see Sidgewick's "Organic Chemistry of Nitrogen," 1937 edition, pages 136 and 152).

The imide compounds of the indicated type are illustrated by Formula I:

Formula I

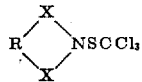

in which R represents an organic radical, nucleus or one or more organic residues and X is part of an acyl group, such as for example

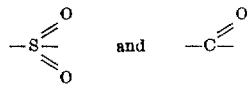

The R may be aliphatic, aromatic, alicyclic, heterocyclic, and their substituted derivatives.

These compounds have been prepared by the general method disclosed in U. S. application Serial No. 50,888, of dissolving the desired imide in aqueous alkaline solution followed by addition of about an equal molecular quantity of perchloromethyl mercaptan. The mixture was stirred rapidly, conveniently until the aqueous medium became acid to litmus, then filtered and air dried. The reaction is conveniently carried out at room temperature. In cases where the imide is readily hydrolyzed in alkaline solutions, it is advantageous to cool the reaction mixture to temperatures as low as 0° C.

The metal compound used to supply the necessary alkaline solution is a compound of an alkali metal such as lithium, sodium and potassium, and the like. Because of cost factors, sodium and potassium are preferred. The alkali is present preferably in amounts equivalent to the imide used. While other basic compounds may be used, it is desirable to use the alkali hydroxides because of the consequent avoidance of the presence of other anion radicals which might have to be removed.

It is believed that the solution of the imide and the alkali hydroxide solution results in the formation of alkali metal imide salt which reacts with the perchloromethyl mercaptan.

This reaction is illustrated by Formula II below where M represents an alkali metal.

Formula II

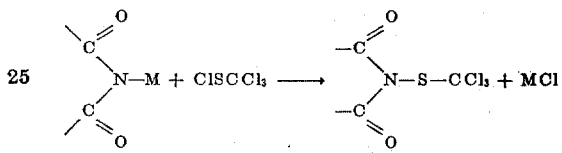

The present invention is an improved method of making N-trichloromethylthioimides. The method comprises adding a neutral water-soluble salt to the alkali metal imide salt solution prior to the admixing of the latter with perchloromethyl mercaptan. The method of this invention results in substantial increases in product yields.

It would normally be expected that the addition of a large amount of one of the products of reaction to the reaction mixture would have an adverse effect either on the rate of reaction or the yield of desired product, N-trichloromethylthioimide.

Another factor which makes the higher yields of this invention unexpected, is that the reaction is between essentially water-insoluble perchloromethyl mercaptan and water-soluble alkali metal imide. The addition of a large amount of a neutral water-soluble salt would be expected to further decrease the very slight solubility of the mercaptan in the aqueous phase and hence the yields.

The neutral water-soluble salt is added preferably in quantities up to about the point where the alkali metal imide salt precipitates out of solution. It has been found that product yields increase with the amounts of neutral salt added up to about the point indicated. This precipitation point of the alkali metal imide salt can be readily observed as the metal imide crystals which precipitate out of solution are white and plate-like in structure and dissimilar to the neutral salts employed. No harm is done, however, if small amounts of the alkali metal imide salt precipitate out of solution as upon conversion of dissolved alkali metal imide salt to the N-trichloromethylthioimide, the precipitated alkali metal imide salt dissolves in the aqueous medium.

The neutral salts used in this invention are salts of strong bases and acids such as sodium chloride and potassium chloride. Although salts other than the potassium chloride or sodium chloride may be added to give an improvement in yield of product in this reaction, these salts have the advantage of low cost and do not contaminate the reaction mixture with anions or cations other than those formed in the main reaction where the corresponding hydroxide has been employed to form the imide salt. Thus, for example, when the potassium imide salt is one of the reactants, it is preferable to use the potassium chloride neutral salt. When the sodium imide is one of the reactants, it is preferable to use sodium chloride as the neutral salt.

The improved method of this invention is illustrated in the following examples:

Example 1

This run was made under the conventional conditions for preparing N-trichloromethylthio phthalimide. 139 g. of potassium phthalimide was dissolved in cold water (600 cc.) and while stirring rapidly at 8°–20° C., 139.5 g. of perchloromethyl mercaptan was added over a period of 8 minutes. The reaction mixture became acid to litmus 10 minutes after the ClSCCl₃ had been added. Filtration and air drying of the residue gave 174 g. of a white crystalline product which on chemical analysis showed that a 65% yield of N-trichloromethylthio phthalimide had been formed.

Example 2

This preparation was carried out in the same manner as in Example 1 except that 149 g. of KCl was added to the aqueous solution of potassium phthalimide prior to reaction with perchloromethyl mercaptan. 197 g. of product was obtained which on chemical analysis proved that an 85% yield of N-trichloromethylthio phthalimide had been obtained. This indicates a yield improvement of 31% over Example 1.

Example 3

113.3 g. (0.75 mole) of tetrahydrophthalimide was dissolved in 600 cc. of water containing 0.75 mole of NaOH. 139.5 g. of ClSCCl₃ (0.75 mole) was added from a dropping funnel to the rapidly stirred solution over a period of 8 minutes. The temperature of reaction was maintained at 20° C. After completion of the reaction and isolation of the product a 91.1% yield (205 g.) of N-trichloromethylthio tetrahydrophthalimide was obtained.

Example 4

An identical run was made as in Example 3 except that 100 g. of NaCl was added to the aqueous sodium tetrahydrophthalimide solution prior to reaction with ClSCCl₃. In this case 218 g. (96.9% yield) of N-trichloromethylthio tetrahydrophthalimide was recovered. This indicates a yield improvement of 6.3% over the already high yield obtained in Example 3.

As pointed out above, it is preferred to use sodium chloride or potassium chloride as the added salts so as not to introduce new components into the reaction mixture. Other neutral water-soluble salts have been tried, i. e., sodium sulfate, and these also gave large increases in yield.

Salts of weak acids and weak base are not satisfactory in this reaction. Thus, a salt of a weak base and a strong acid, such as ammonium chloride, decomposes sodium imide to form sodium chloride and the free imide precipitates out and as a result will not react with the perchloromethyl mercaptan. The salt of a strong base and a weak acid, such as sodium carbonate, reacts with the perchloro methyl mercaptan in competition with the sodium imide forming undesirable by-products, thereby resulting in low yields of the desired product.

It is preferable to add the neutral water-soluble salt to the aqueous solution subsequent to the solution of the alkali metal imide salt therein but prior to the addition of perchloromethyl mercaptan. This procedure results in better solution of the imide. Some of the imides which are prepared by the process of this invention include: N-trichloromethylthio tetrahydrophthalimide, N-trichloromethylthio phthalimide, N-trichloromethylthio endomethylene - tetrahydrophthalimide, N-trichloromethylthio succinimide, N-trichloromethylthio 4-nitrophthalimide, etc.

The method of this invention is also ideally adapted for the preparation of N-trichloromethylthio imides other than those of dicarboxylic acids, e. g., (N-trichloromethylthio) o-sulfobenzimide. The method of this invention can also advantageously be employed for the preparation of N-trichloromethylthio amides, sulfonamides, and related compounds.

Observations indicate that the increased yields of products obtained by the process of this invention result from an actual increase in the amounts of the products formed, rather than from an improvement in product separation. It is not intended, however, to be limited by any theory of operation.

It is to be understood that the invention is not limited to the specific examples which have been offered merely as illustrative and that modifications may be made without departing from the spirit of the invention.

What is claimed is:

1. In a process for the preparation of an N-trichloromethylthio imide which comprises the steps of dissolving an imide in an aqueous alkaline solution of an alkali metal compound and reacting the resulting alkali metal imide product dissolved in the aqueous media with admixed perchloromethyl mercaptan, the improvement which comprises adding a neutral water-soluble salt to the aqueous imide solution prior to the addition of perchloromethyl mercaptan.

2. A process as in claim 1 in which the neutral water-soluble salt is added in an amount up to about the point where the alkali metal imide precipitates out of solution.

3. In a process for the preparation of an N-trichloromethylthio imide of a dicarboxylic acid which comprises the steps of dissolving an imide in an aqueous alkaline solution of an alkali metal compound and reacting the resulting alkali metal imide product dissolved in the aqueous media with admixed perchloromethyl mercaptan, the improvement which comprises adding a neutral water-soluble salt to the aqueous imide solution prior to the addition of perchloromethyl mercaptan.

4. A process as in claim 3 in which the neutral water-soluble salt is added in an amount up to about the point where the alkali metal imide precipitates out of solution.

5. A process as in claim 4 in which the N-trichloromethylthio imide is phthalimide, the alkali metal compound is potassium hydroxide, and the neutral water-soluble salt is potassium chloride.

6. A process as in claim 3 in which the N-trichloromethylthio imide is tetrahydrophthalimide, the alkali metal compound is sodium hydroxide, and the neutral water-soluble salt is sodium chloride.

7. In a process for the preparation of an N-trichloromethylthio imide which comprises the steps of forming an aqueous solution of an alkali metal imide and reacting the dissolved alkali metal imide with admixed perchloromethyl mercaptan the improvement which comprises adding a neutral water-soluble salt to the aqueous imide solution prior to the addition of the perchloromethyl mercaptan.

8. A process as in claim 7 in which the N-trichloromethylthio imide is an imide of a dicarboxylic acid.

9. A process as in claim 8 in which the neutral water-soluble salt is a salt of the corresponding alkali metal employed in the alkali metal imide.

10. A process as in claim 9 in which the alkali metal neutral water-soluble salt is added in an amount up to about the point where the alkali metal imide precipitates out of solution.

11. A process as in claim 10 in which the alkali metal imide is sodium tetrahydrophthalimide and the alkali metal neutral water-soluble salt is sodium chloride.

12. In a process for the preparation of an N-trichloromethylthio imide which comprises the steps of forming an aqueous solution of an alkali metal imide and reacting the dissolved alkali metal imide with admixed perchloromethyl mercaptan the improvement which comprises carrying out the reaction in the presence of an added neutral water soluble salt.

13. In a process for the preparation of an N-trichloromethylthio imide which comprises dissolving an imide having a single reactive NH group in an aqueous alkaline solution of an alkali metal compound and reacting the resulting alkali metal imide product dissolved in the aqueous media with admixed perchloromethyl mercaptan, whereby the reactive NH group reacts with the perchloromethyl mercaptan, the improvement which comprises adding a neutral water-soluble salt to the aqueous imide solution prior to the addition of the perchloromethyl mercaptan.

ALLEN R. KITTLESON.

No references cited.